(12) United States Patent
Huang

(10) Patent No.: US 11,223,214 B2
(45) Date of Patent: Jan. 11, 2022

(54) POWER MANAGEMENT SYSTEM AND OPERATING METHOD THEREOF

(71) Applicant: National Taipei University of Technology, Taipei (TW)

(72) Inventor: Kuohsiu David Huang, Taipei (TW)

(73) Assignee: NATIONAL TAIPEI UNIVERSITY OF TECHNOLOGY, Taipei (TW)

( * ) Notice: Subject to any disclaimer, the term of this patent is extended or adjusted under 35 U.S.C. 154(b) by 0 days.

(21) Appl. No.: 16/951,842

(22) Filed: Nov. 18, 2020

(65) Prior Publication Data

US 2021/0075240 A1 Mar. 11, 2021

Related U.S. Application Data

(62) Division of application No. 16/220,180, filed on Dec. 14, 2018, now Pat. No. 10,879,709.

(51) Int. Cl.
*H02J 7/00* (2006.01)
(52) U.S. Cl.
CPC .......... *H02J 7/0021* (2013.01); *H02J 7/0047* (2013.01)

(58) Field of Classification Search
CPC .......... H02J 7/0021; H02J 7/0047; H02J 7/00
See application file for complete search history.

(56) References Cited

U.S. PATENT DOCUMENTS

2019/0317151 A1* 10/2019 Ballantine ............ G01R 31/392
2020/0044482 A1* 2/2020 Partovi ................. G06F 1/1683

* cited by examiner

*Primary Examiner* — Vuthe Siek
(74) *Attorney, Agent, or Firm* — Tracy M. Heims; Apex Juris, PLLC.

(57) ABSTRACT

A power management system includes a battery charging system, a power supplying system, a first switching module, and a second switching module. The power management system is switched between the battery charging system and the power supplying system via the first switching module and the second switching module. With a charging electric energy generated by the waveform generating module, the battery charging system could restore the aging battery or the battery with degraded performance to a better state when the batteries are charging. By sensing a battery state of batteries, the power supplying system provides a supplementing power to the batteries, and the supplementing power and a power of the batteries could be supplied to a load together.

7 Claims, 16 Drawing Sheets

POWER MANAGEMENT SYSTEM AND OPERATING METHOD THEREOF

BACKGROUND OF THE INVENTION

Technical Field

The present invention relates generally to battery charging and discharging, battery power supplies, and power managements, and more particularly to power management systems and operating methods thereof, battery charging systems for charging batteries by using charging electric energy having composite waveforms and operating methods thereof, and power supplying systems and operating methods thereof.

Description of Related Art

A power management system is used for battery charging and discharging management. A conventional power management system A1 is shown in FIG. 1, which is electrically connected to a battery pack A2 and a load L, wherein the battery pack A2 includes a plurality of batteries A2a electrically connected in series.

Taking the conventional power management system A1 switching to a charging mode as an example, when the conventional power management system A1 charges the battery pack A2, the conventional power management system A1 usually needs to consume a large amount of energy to charge the battery pack A2. In addition, if one of the batteries A2a in the battery pack A2 is damaged or its performance is degraded, the charging efficiency of the conventional power management system A1 would be poor.

Taking the conventional power management system A1 switching to a power supplying mode as an example, when one of the batteries A2a in the battery pack A2 is damaged or its performance is degraded, the power supplied from the battery pack A2 could not reach the power requirement of the load L, or the battery pack A2 could not stably supply power to the load L due to the damaged or degraded battery A2a that causes an unbalanced power.

In addition, each of the batteries A2a has a plurality of battery cells, wherein when one of the batteries A2a has a battery cell with poor performance, a power supplying efficiency of the battery A2a would be poor. Therefore, a manufacturer tests the battery cells while producing the batteries A2a, and the battery cells with similar characteristics would be matched to form a battery A2a, whereby avoiding the inefficiency of the battery A2a. However, such process of testing the battery cells takes a lot of time, which causes poor production efficiency and high production cost.

Moreover, although the battery cells are all tested, the battery cells may be aging or damaged. When the performance of the battery A2a lowers due to the degraded or damaged battery cell, battery A2a will be replaced, which is extremely environmentally unfriendly and not economical. Also, in a system including a plurality of batteries A2a electrically connected in series, the power supplying performance thereof would be affected by one of the degraded or damaged batteries A2a. In all aspects, the conventional power management system A1 still has room for improvements.

A conventional charging device B1 which is electrically connected to a battery pack B2 is shown in FIG. 2, wherein the battery pack B2 includes at least one battery B2a, and the conventional charging device B1 is adapted to charge the battery pack B2. However, the conventional charging device B1 cannot provide different charging electric energies for different types of batteries B2a and cannot simultaneously charge different types of batteries B2a but can only charge a specific type of batteries B2a.

Additionally, the conventional charging device B1 cannot detect the charging state of the battery B2a, so that when the conventional charging device B1 charges the battery B2a, it cannot know whether the battery B2a is fully charged, damaged or the energy storage efficiency thereof is degraded. Therefore, even when the battery B2a is fully charged, the charging device B1 will continue to charge it, which may reduce the service life of the battery B2a. Also, when the battery B2a is damaged or the energy storage efficiency thereof is not good, an abnormality of the battery pack B2 is often found when the user uses the battery pack B2. In all aspects, the conventional charging device B1 still has room for improvements.

BRIEF SUMMARY OF THE INVENTION

In view of the above, one of the primary objectives of the present invention is to provide an improved power management system and operating methods thereof, which could provide extra energy for supplementing an insufficient output energy of a battery pack to a load when the performance of at least one battery in the battery pack is degraded or damaged, and could allow the battery performance of the battery pack to be restored to a better battery performance by charging.

In addition, another primary objective of the present invention is to provide a battery charging system and operating methods thereof, which could charge various kinds of batteries.

In addition, another primary objective of the present invention is to provide a battery charging system that could enhance the performance of a battery.

In addition, another primary objective of the present invention is to provide an operating method of a battery charging system that could provide a better charging mode to a battery.

In addition, another primary objective of the present invention is to provide a power supplying system, which could provide extra energy for supplementing an insufficient output energy of a battery to a load when the performance of at least one battery in a battery pack is degraded or damaged.

In addition, another primary objective of the present invention is to provide an operating method of a power supplying system, which could provide a better power supplying mode to a load.

The present invention provides a power management system, which is adapted to be electrically connected to a battery pack, wherein the battery pack is electrically connected to a load and includes a plurality of batteries that are electrically connected in series. The power management system includes a sensing module, a waveform generating module, a power supplementing module, and a control device, wherein the sensing module is adapted to be electrically connected to the batteries to sense the battery state of each of the batteries. The waveform generating module has a power source side and a load side, wherein the power source side is electrically connected to a power source and is adapted to receive power sent from the power source. The load side is adapted to be electrically connected to the batteries respectively via a first switching module. The first switching module is controlled to turn on or off an electrical connection between the waveform generating module and the batteries. The power supplementing module is electrically connected to the power source and is adapted to be electrically connected to the batteries respectively via a second switching module, wherein the second switching module is controlled to turn on or off an electrical connection between the power supplementing module and the batteries. The control device is electrically connected to the sensing module, the waveform generating module, the power supplementing module, the first switching module, and the second switching module, wherein the control device operates in one of a plurality of operation modes. The operation modes include a first operation mode and a second operation mode. When the control device operates in the first operation mode, the control device controls the first switching module to turn on and controls the second switching module to turn off. According to a first parameter value corresponding to the battery state of each of the batteries, the control device controls the waveform generating module to convert the power sent from the power source into a plurality of charging waveforms corresponding to the first parameter values, to mix the charging waveforms to form a charging electric energy having a composite waveform, and to send the charging electric energy to the respective batteries to charge the batteries. When the control device operates in the second operation mode, the control device controls the second switching module to turn on and controls the first switching module to turn off. According to a second parameter value formed by the battery state of each of the batteries, the control device controls the power supplementing module to output a supplementing power to at least one of the batteries so that the supplementing power and the power of the batteries are supplied to the load together.

The present invention provides an operating method of a power management system, wherein the power management system is electrically connected to a battery pack, and the battery pack is electrically connected to a load. The battery pack includes a plurality of batteries that are electrically connected in series; the power management system includes a sensing module, a waveform generating module, a power supplementing module, a control device, a first switching module, and a second switching module, wherein the sensing module is electrically connected to the batteries. The waveform generating module has a power source side and a load side. The power source side is electrically connected to a power source and is adapted to receive power sent from the power source. The load side is electrically connected to the batteries respectively via the first switching module. The power supplementing module is electrically connected to the power source and is electrically connected to the batteries respectively via the second switching module. The control device is electrically connected to the sensing module, the waveform generating module, the power supplementing module, the first switching module, and the second switching module. The control device operates in one of a plurality of operation modes, wherein the operation modes include a first operation mode and a second operation mode. The first operation mode includes steps of: A1. controlling the first switching module to turn on by the control device, controlling the second switching module to turn off by the control device, and sensing the battery state of each of the batteries by the sensing module; A2. sending a first parameter value corresponding to the battery state of each of the batteries to the control device; A3. controlling the waveform generating module to convert the power sent from the power source into a plurality of charging waveforms corresponding to the first parameter values by the control device according to the first parameter value and mixing the charging waveforms to form a charging electric energy having a composite waveform, and sending the charging electric energy to the batteries from the load side of the waveform generating module for charging. The second operation mode includes steps of: B1. controlling the second switching module to turn on by the control device, controlling the first switching module to turn off by the control device, sensing the battery state of each of the batteries by the sensing module, and sending a second parameter value corresponding to the battery state to the control device; B2. determining whether the second parameter value of any of the batteries is smaller than a predetermined value; if so, sending a supplementing power to each of the batteries which has the second parameter value smaller than the predetermined value and supplying electricity to the load from both of the supplementing power and the power of the batteries; otherwise, sending the power of the batteries to the load.

The present invention provides a charging system, which is adapted to charge at least one battery, and includes a waveform generating module, a sensing module, and a control device, wherein the waveform generating module has a power source side and a load side. The power source side is electrically connected to a power source and is adapted to receive a power sent from the power source, and the load side is electrically connected to the at least one battery. The sensing module is adapted to be electrically connected to at least one battery and senses a plurality of battery states of at least one battery to obtain a parameter value corresponding to each of the battery states. The control device is electrically connected to the sensing module and the waveform generating module and is adapted to control the waveform generating module according to the parameter values sensed by the sensing module so that the waveform generating module converts power sent from the power source into a plurality of charging waveforms respectively corresponding to the parameter values and mixes the charging waveforms to form a charging electric energy having a composite waveform, and sends the charging electric energy to at least one battery via the load side.

The present invention provides an operating method of a battery charging system, wherein the battery charging system is adapted to charge at least one battery, and the battery charging system includes a waveform generating module, a sensing module, and a control device. The waveform generating module has a power source side and a load side, wherein the power source side is electrically connected to a power source, and the load side is electrically connected to at least one battery. The sensing module is electrically connected to at least one battery. The control device is electrically connected to the waveform generating module and the sensing module. The operating method includes steps of: A. sensing a plurality of battery states of at least one battery by the sensing module to obtain a parameter value corresponding to each of the battery states; B. controlling the waveform generating module by the control device according to the parameter values sensed by the sensing module so that the waveform generating module converts power sent from the power source into a plurality of charging waveforms corresponding to the parameter value, and mixes the charging waveforms to form a charging electric energy having a composite waveform; C. sending the charging electric energy to the at least one battery via the load side.

The present invention provides a power supplying system, which is adapted to supply a power to a load and includes a plurality of batteries and a control device, wherein the batteries are adapted to be electrically connected to the load. Each of the batteries has a positive electrode and a negative electrode. The control device electrically connected to the positive electrode and the negative electrode of each of the batteries, wherein the control device senses a parameter value of each of the batteries, and sends a supplementing power to the positive electrode and the negative electrode of the corresponding battery when the sensed parameter value is smaller than a predetermined value, so that the supplementing power and the power of the batteries are supplied to the load together.

The present invention provides an operating method of a power supplying system, wherein the power supplying system is adapted to supply a power to a load; the power supplying system includes a plurality of batteries and a control device. The control device is electrically connected to a positive electrode and a negative electrode of each of the batteries. The operating method includes steps of: A. sensing a parameter value of each of the batteries by the control device; B. determining whether the parameter value of any of the batteries is smaller than a predetermined value; if so, sending a supplementing power to the positive electrode and the negative electrode of the corresponding battery which has the parameter value smaller than the predetermined value, and supplying electricity to the load from both of the supplementing power and the power of the batteries; otherwise, sending the power of the batteries to the load.

With the power management system of the present invention and the operating methods thereof, the battery state of the batteries could be sensed via the power management system, so that the battery cells of the batteries could be prevented from aging when the batteries are charging, extending the service life of the batteries, enhancing the charging efficiency, and providing a better environmental protection effect. In addition, when the batteries supply power to the load, the problem of inconsistent power of the batteries sent to the load could be solved.

With the aforementioned design, the charging system could charge depending on different batteries or different battery states by generating different charging waveforms via the waveform generating module, whereby providing a better charging performance to the batteries so that the batteries could be maintained better, extending a service life of the batteries, and providing a better environmental protection effect.

With the aforementioned design, the control device could sense the parameter value of each of the batteries and could determine whether the batteries require the supplementing power or not according to the parameter values. When the batteries require the supplementing power, the control device sends the supplementing power to the batteries, so that the power supplying system could stably supply power to the load, and the power supplying system would not be affected by the degradation of the performance of the batteries or the damage of the batteries, providing a better environmental protection effect, which is economical.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
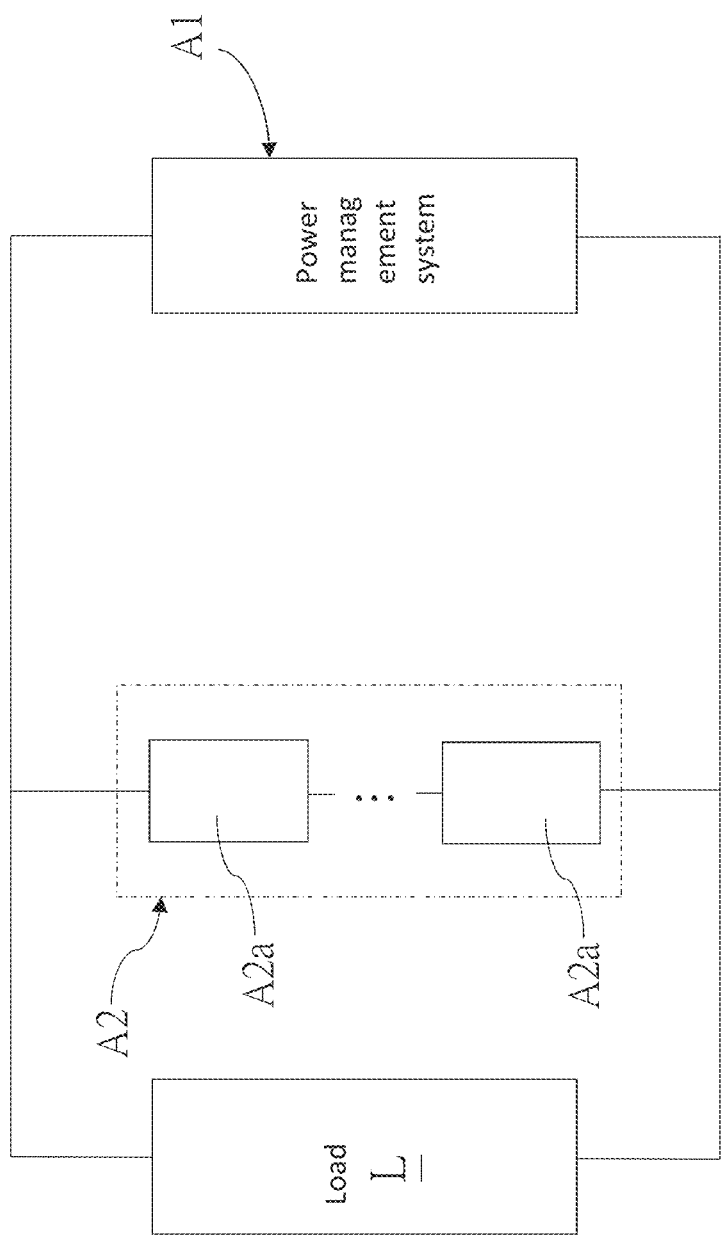
FIG. 1 is a block diagram of a conventional power management system.
Figure 2:
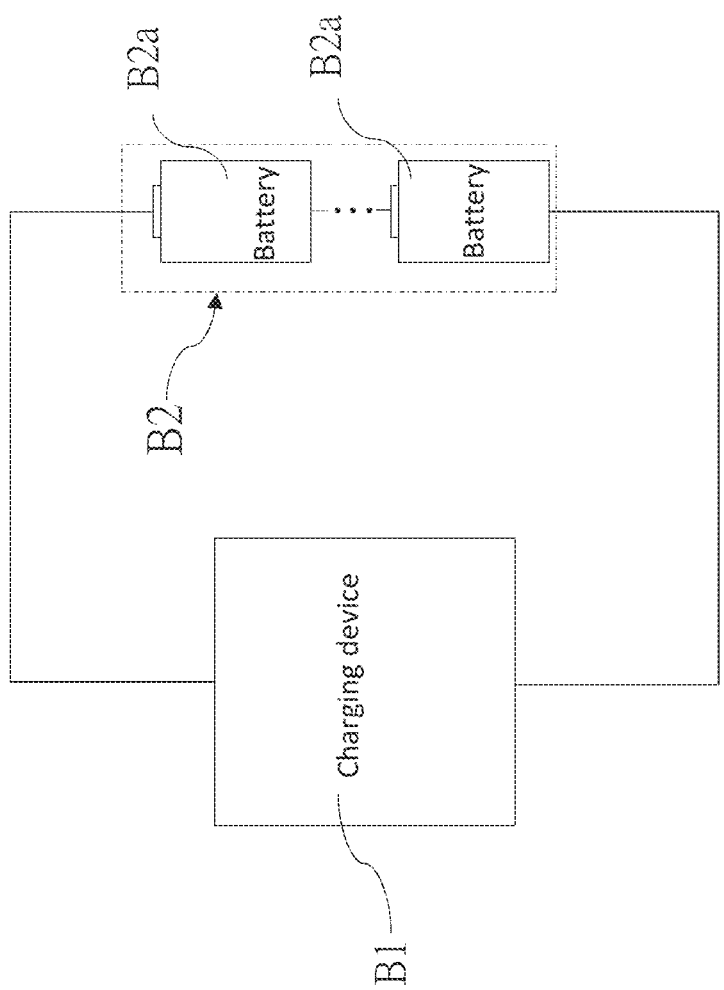
FIG. 2 is a schematic view, showing a conventional charging device that charges a battery pack.
Figure 3:
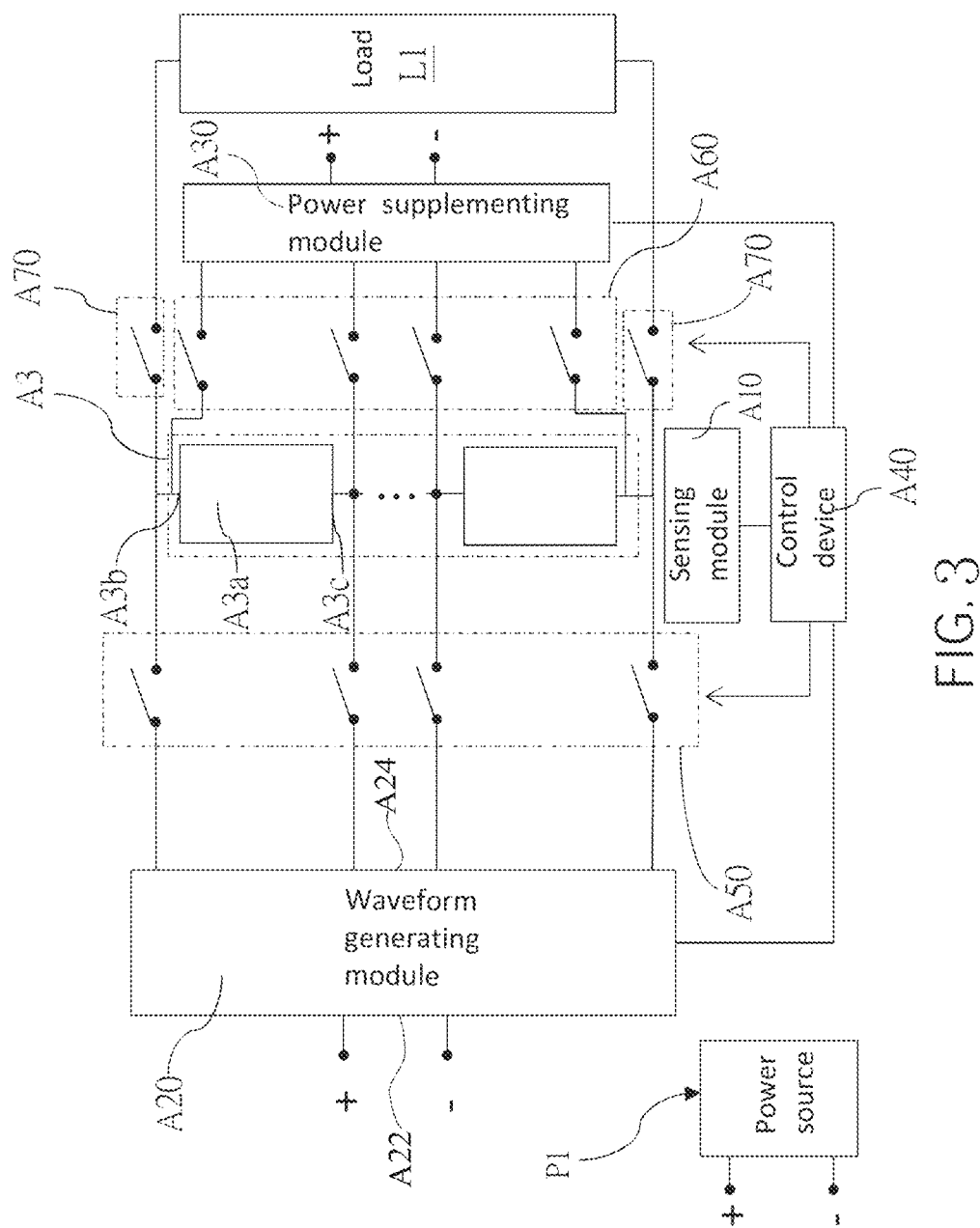
FIG. 3 is a block diagram of the power management system according to an embodiment of the present invention.
Figure 4A:
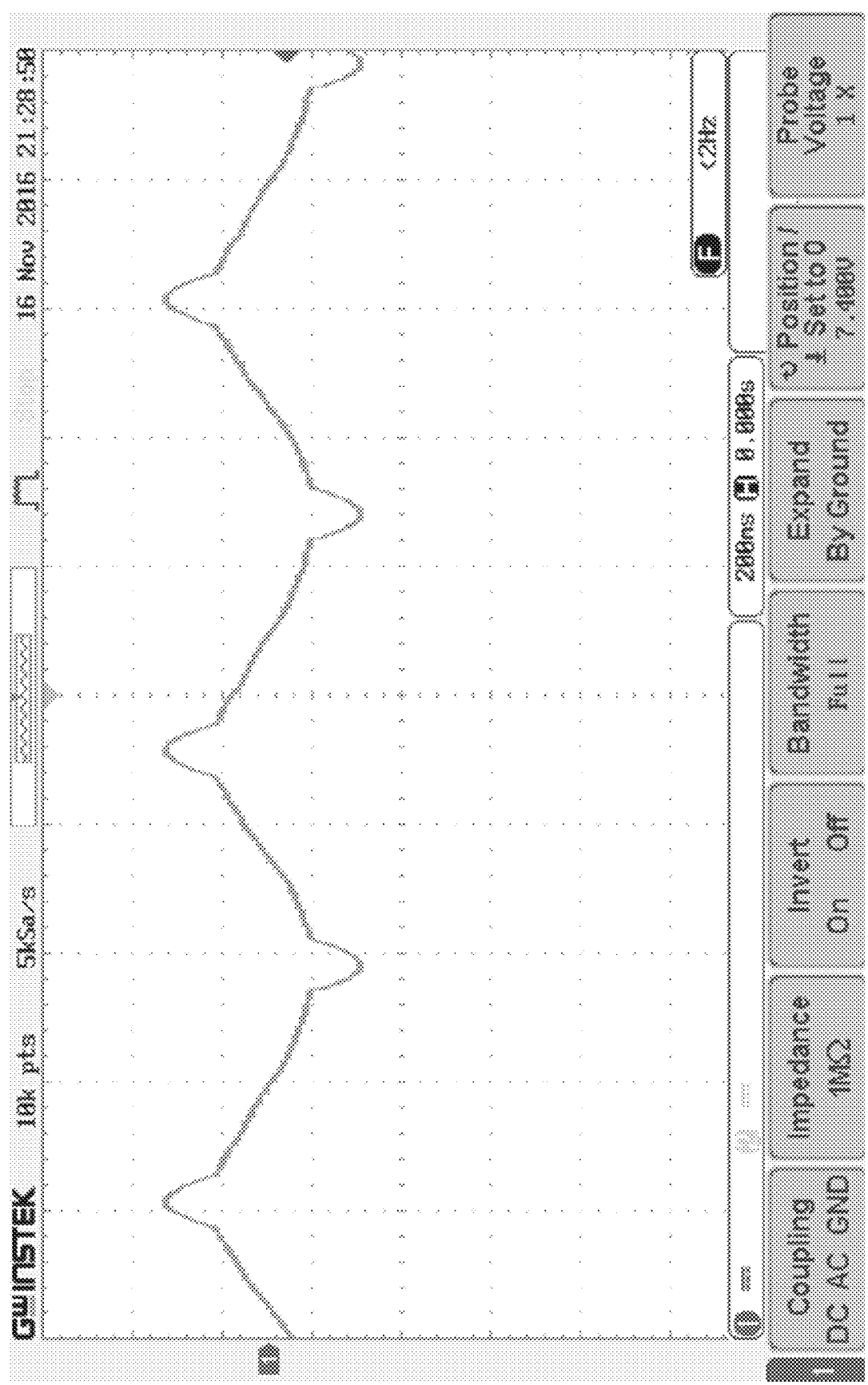
FIG. 4A is a graph showing the experimental data generated by the waveform generating module according to an embodiment of the present invention.
Figure 4B:
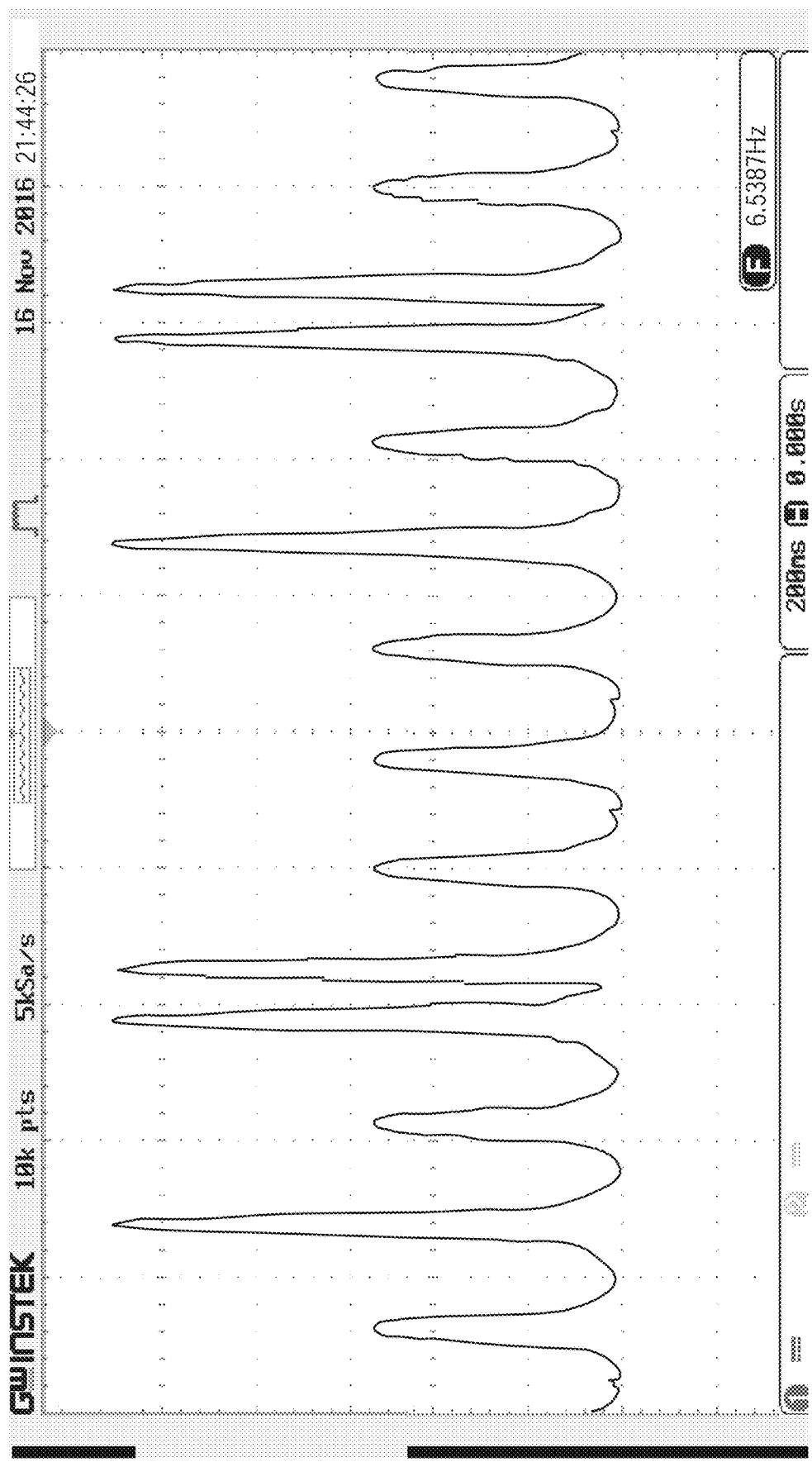
FIG. 4B is a graph showing the experimental data generated by the waveform generating module according to an embodiment of the present invention.
Figure 4C:
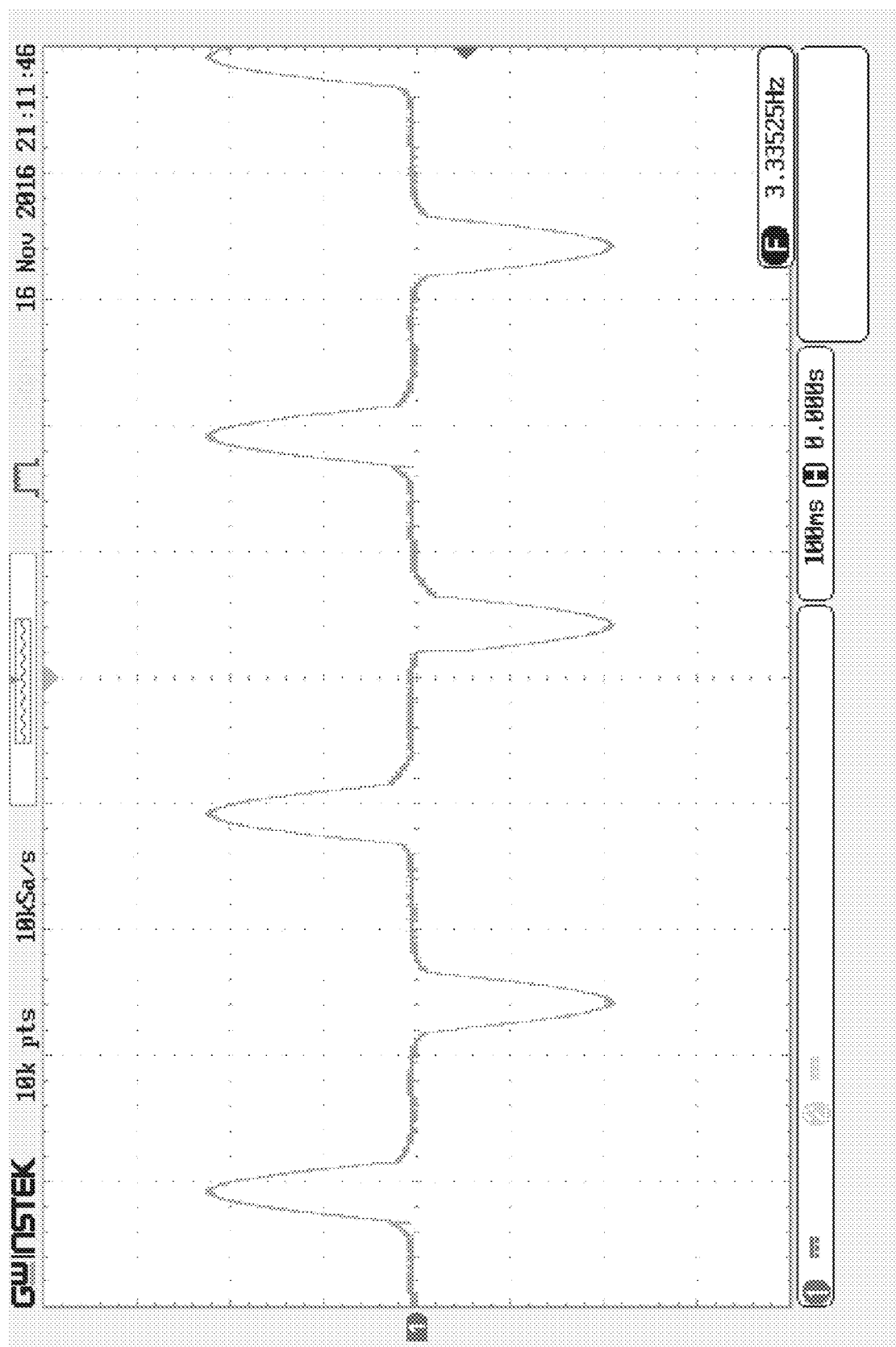
FIG. 4C is a graph showing the experimental data generated by the waveform generating module according to an embodiment of the present invention.
Figure 4D:
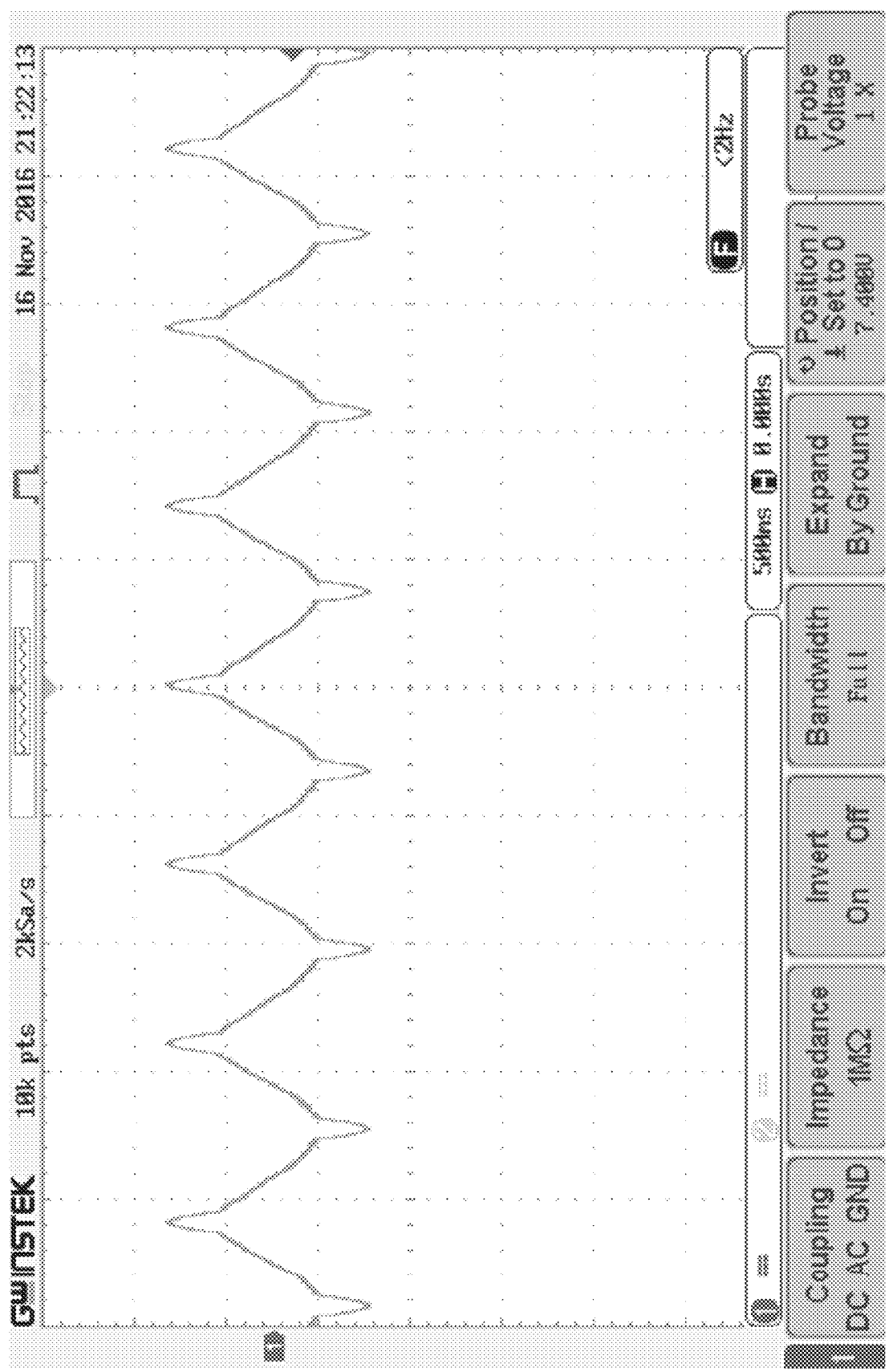
FIG. 4D is a graph showing the experimental data generated by the waveform generating module according to an embodiment of the present invention.

A power management system of an embodiment according to the present invention is illustrated in FIG. 3, wherein the power management system is adapted to be electrically connected to a battery pack A3. The battery pack A3 is electrically connected to a load L1 and includes a plurality of batteries A3$a$ that are electrically connected in series, wherein the batteries A3$a$ include various of types, for instance, a material of a positive electrode of the batteries A3$a$ is made of ionic compound, and a material of a negative electrode of the batteries A3$a$ is made of graphite, graphene, silicon compound, aluminum compound, lithium metal or the like. The ionic compound could be, for example, spinel oxide, phosphate, silicate or the like. However, this is not a limitation of the present invention. The power management system includes a sensing module A10, a waveform generating module A20, a power supplementing module A30, a control device A40, a first switching module A50, a second switching module A60, and a third switching module A70, wherein based on a circuit function, the sensing module A10, the waveform generating module A20, and the control device A40 constitute a charging system, and the sensing module A10, the power supplementing module A30, and the control device A40 constitute a power supplying system.

The circuit functions and the relations between the sensing module A10, the waveform generating module A20, the power supplementing module A30, and the control device A40 will be described first, and the operation of both of the charging system and the power supplying system will be described in detail later.

The sensing module A10 is electrically connected to the batteries A3a and the control device A40 and is adapted to sense the battery state of each of the batteries A3a. In the current embodiment, the sensed battery state includes at least one of a direct-current internal resistance (DCIR), an alternating current internal resistance (ACIR), and a state of health (SOH). The battery state of each of the batteries A3a corresponds to a first parameter value, and a current value between a positive electrode A3b and a negative electrode A3c of each of the batteries A3a corresponds to a second parameter value, wherein each of the first parameter values is one of a resistance value, a frequency value, a voltage value, a current value, and a power value, and each of the first parameter values is adapted to set at least one of an amplitude, a frequency, an offset voltage of a charging electric energy.

The waveform generating module A20 has a power source side A22 and a load side A24, wherein the power source side A22 is electrically connected to a power source P1 and is adapted to receive power sent from the power source P1, and the load side A24 is electrically connected to the control device A40 and the first switching module A50. The first switching module A50 is controlled by the control device A40 to turn on or off the electrical connection between the waveform generating module A20 and the batteries A3a. When the first switching module A50 is turned on, the power sent from the waveform generating module A20 could charge the batteries A3a. As shown in FIG. 4A to FIG. 4D, in the current embodiment, the waveform generating module A20 converts the power sent from the power source P1 into a plurality of charging waveforms and mixes the charging waveforms to form at least one charging electric energy having a composite waveform, and sends the charging electric energy to the corresponding battery A3a, whereby respectively charging the batteries A3a. The composite waveform is composed of at least one waveform of a basic waveform. For instance, the basic waveform could be a square wave, a triangular wave, a sine wave, a pulse wave, etc., and the basic waveforms may also vary with amplitude, frequency, and the like. However, the basic waveform is not limited to the examples given above.

The power supplementing module A30 is electrically connected to the power source P1, the control device A40, and the second switching module A60, wherein the power supplementing module A30 is controlled by the control device A40 to output power. The control device A40 is configured to control the waveform generating module A20, the power supplementing module A30, the first switching module A50, the second switching module A60, and the third switching module A70 to operate based on a sensing result of the sensing module A10 and a circuit requirement. For instance, when the control device A40 controls the second switching module A60 to turn on, the power supplementing module A30 is electrically connected to the batteries A3a, and outputs a supplementing power to the corresponding battery A3a. When the control device A40 controls the second switching module A60 and the third switching module A70 to turn on at the same time, the supplementing power sent from the power supplementing module A30 is supplied to not only the corresponding battery but also the load L1.

Figure 5:
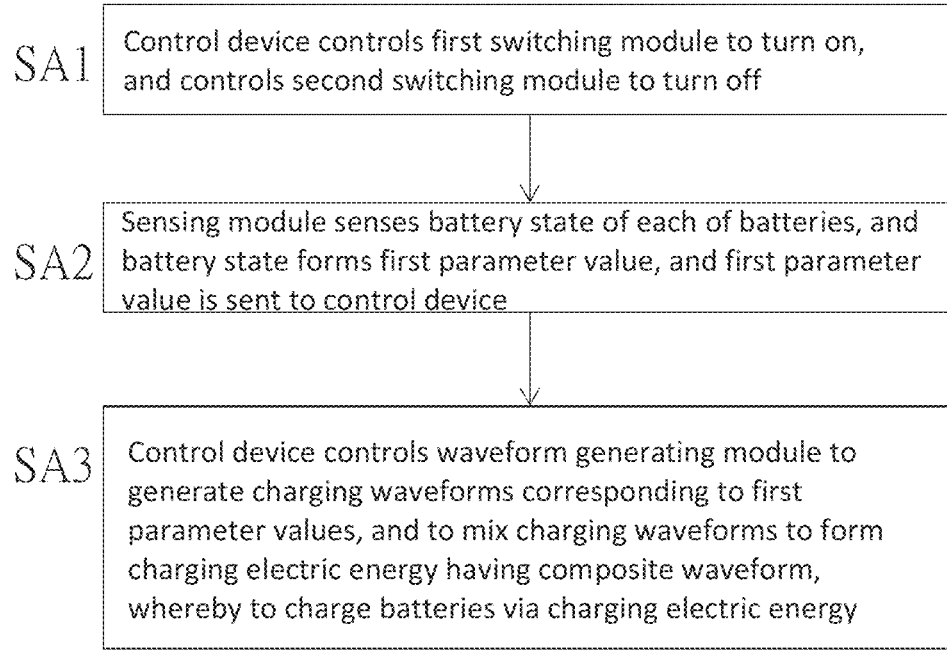
FIG. 5 is a flowchart showing the operating method of the power management system when the power management system is in the first operation mode.

With the aforementioned design, the operating method according to the current embodiment could be executed, wherein the control device A40 stores a controlling method for controlling a first operation mode and a second operation mode. When the power management system is in the first operation mode, the circuit of the power management system related to the charging system will start to operate to charge the battery pack A3, including the following steps shown in FIG. 5.

First, in step SA1, the control device A40 controls the first switching module A50 to turn on, and controls both the second switching module A60 and the third switching module A70 to turn off.

In step SA2, the sensing module A10 senses the battery state of each of the batteries A3a. In the current embodiment, the battery state includes the current value between the positive electrode A3b and the negative electrode A3c of each of the batteries A3a, the DCIR, the SOH, and the ACIR. After the battery state of the batteries A3a is measured, the battery state is formed into the first parameter value to be sent to the control device A40, and the sensing module A10 obtains the corresponding first parameter value via the battery state, wherein the first parameter value includes a resistance value, a voltage value, a power value, a current value, and etc. In other embodiments, the battery state further includes a state of charge (SOC).

In step SA3, the control device A40 controls the waveform generating module A20 to convert the power sent from the power source P1 into a plurality of charging waveforms based on each of the first parameter values, and to mix the charging waveforms to form a charging electric energy having a composite waveform, whereby charging the batteries A3a via the charging electric energy. In the current embodiment, the amplitude, the offset voltage, and the frequency of the charging electric energy could be set by the control device A40. In other embodiments, the control device A40 could further set the current of the charging electric energy.

For instance, when the battery state sensed by the sensing module A10 is the DCIR and the voltage, the corresponding first parameter value is a resistance value and a voltage value. The control device A40 performs a value analysis based on the resistance value to determine the type of battery and its amount of power, and controls the waveform generating module A20 to output a corresponding charging waveform. In the current embodiment, the control device A40 determines the amplitude of the charging waveform according to the resistance value and the voltage value and outputs the charging waveform. When the battery state sensed by the sensing module A10 is the ACIR, the corresponding first parameter value is a resistance value of the ACIR. In the current embodiment, the control device A40 determines whether to use a high frequency as a charging frequency, and controls the waveform generating module A20 to output a corresponding charging waveform. For example, when the battery A3a is a lithium battery, the amplitude range of the charging waveform is selected within the range of ±1.0V VS L/Li+ according to the characteristics of lithium ions. When sensing the ACIR, the obtained first parameter value is a resistance value, and the frequency of the charging electric energy is determined whether to use a high frequency according to the resistance value.

The purpose of the above design is so that when the batteries A3a are aged, the resistance value of the ACIR is increased. By using the high-frequency charging electric energy to charge the batteries A3a, the resistance value of the ACIR could be lowered, wherein the high frequency for the lithium batteries is between 500 Hz and 1500 Hz. In addition, when sensing the SOH of the batteries A3a, the obtained first parameter value is a voltage value, and the offset voltage of the composite wave is set by the obtained voltage value, wherein the voltage value refers to the open circuit voltage of the batteries A3a, and the open circuit voltage is used as the offset voltage of the charging electric energy. For instance, when the sensing module A10 senses the SOH of the batteries A3a to obtain the open circuit voltage of the batteries A3a of 3.6V, the offset voltage of the charging electric energy is 3.6V. However, this is not a limitation of the present invention. In other embodiments, the offset voltage of the charging electric energy could be close to the open circuit voltage. For example, when the open circuit voltage is 3.6V, the offset voltage of the charging electric energy could be between 3.6±10%.

In addition, after step SA3, further includes a step that the sensing module A10 senses a charging power of each of the batteries A3a, whereby repeating steps SA1 to SA3. For example, when the charging power of the batteries A3a increases by 5%, steps SA1 to SA3 are repeatedly executed. In other embodiments, steps SA1 to SA3 could be repeatedly taken when the charging power of the batteries A3a increases by 10%. However, this is not a limitation of the present invention. In an embodiment, a time interval could be used as a repetition basis to repeat steps SA1 to SA3. For instance, the time interval could be 1 minute. However, this is not a limitation of the present invention.

In this way, the waveform generating module A20 could allow the batteries A3a to be charged via an individual charging electric energy, thereby to extend a service life of the batteries A3a, avoiding the aging of the batteries A3a. Also, the aging or damaged battery A3a can be activated or regenerated by the charging electric energy.

Figure 6:
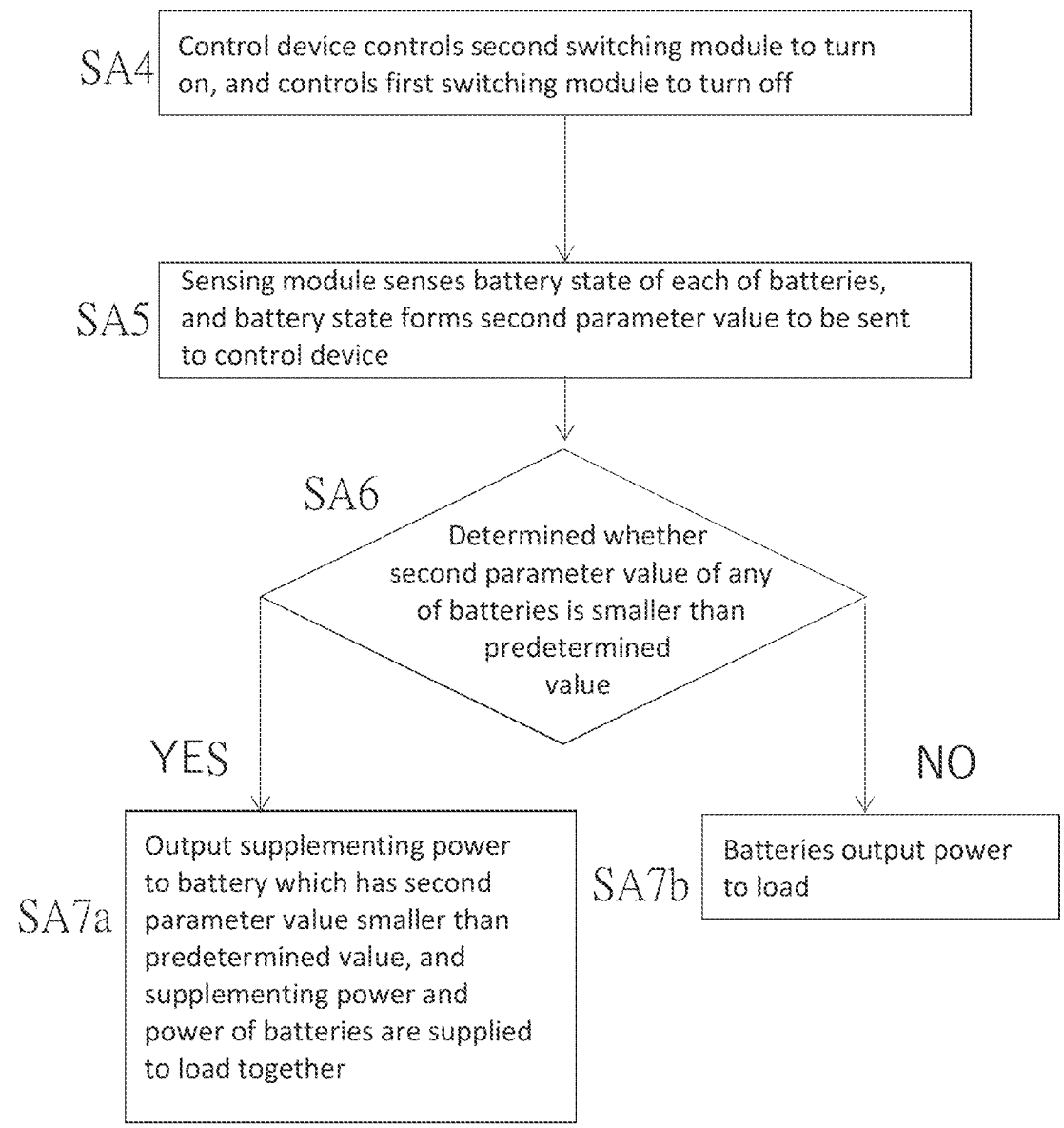
FIG. 6 is a flowchart showing the operating method of the power management system when the power management system is in the second operation mode.

Moreover, when the power management system is in the second operation mode, the circuit of the power management system related to the power supplying system will start to operate to supply power to the load, including the following steps shown in FIG. 6.

First, in step SA4, the control device A40 controls both the second switching module A60 and the third switching module A70 to turn on and controls the first switching module A50 to turn off.

In step SA5, the sensing module A10 senses the battery state of each of the batteries A3a, and the battery state sensed by the sensing module A10 is formed into the second parameter value to be sent to the control device A40. In the current embodiment, the second parameter value is a current value.

In step SA6, it is determined whether the second parameter value of any of the batteries A3a is smaller than a predetermined value. If so, take step SA7a, at this time, the control device A40 controls the power supplementing module A30 to output the supplementing power to the battery A3a which has the second parameter value smaller than the predetermined value, and the supplementing power and the batteries A3a supply power to the load L1 together. Otherwise, take step SA7b, at this time, only the batteries A3a output the power to the load L1. In the current embodiment, the control device A40 sets a charging current of the supplementing power according to the second parameter value. In other embodiments, the control device A40 could set a charging voltage of the supplementing power according to the second parameter value. However, this is not a limitation of the present invention.

In this way, the power supplementing module A30 allows the batteries A3a to have a better power to output to the load L1, solving the problem of inconsistent power of the batteries A3a.

With the aforementioned design, extra energy for supplementing the insufficient output energy of the battery pack A3 to the load could be provided when the performance of at least one of the batteries A3a in the battery pack A3 is degraded or when at least one of the batteries A3a in the battery pack A3 is damaged. Also, the battery performance of the battery pack A3 could be restored to a better battery performance by charging.

Figure 7:
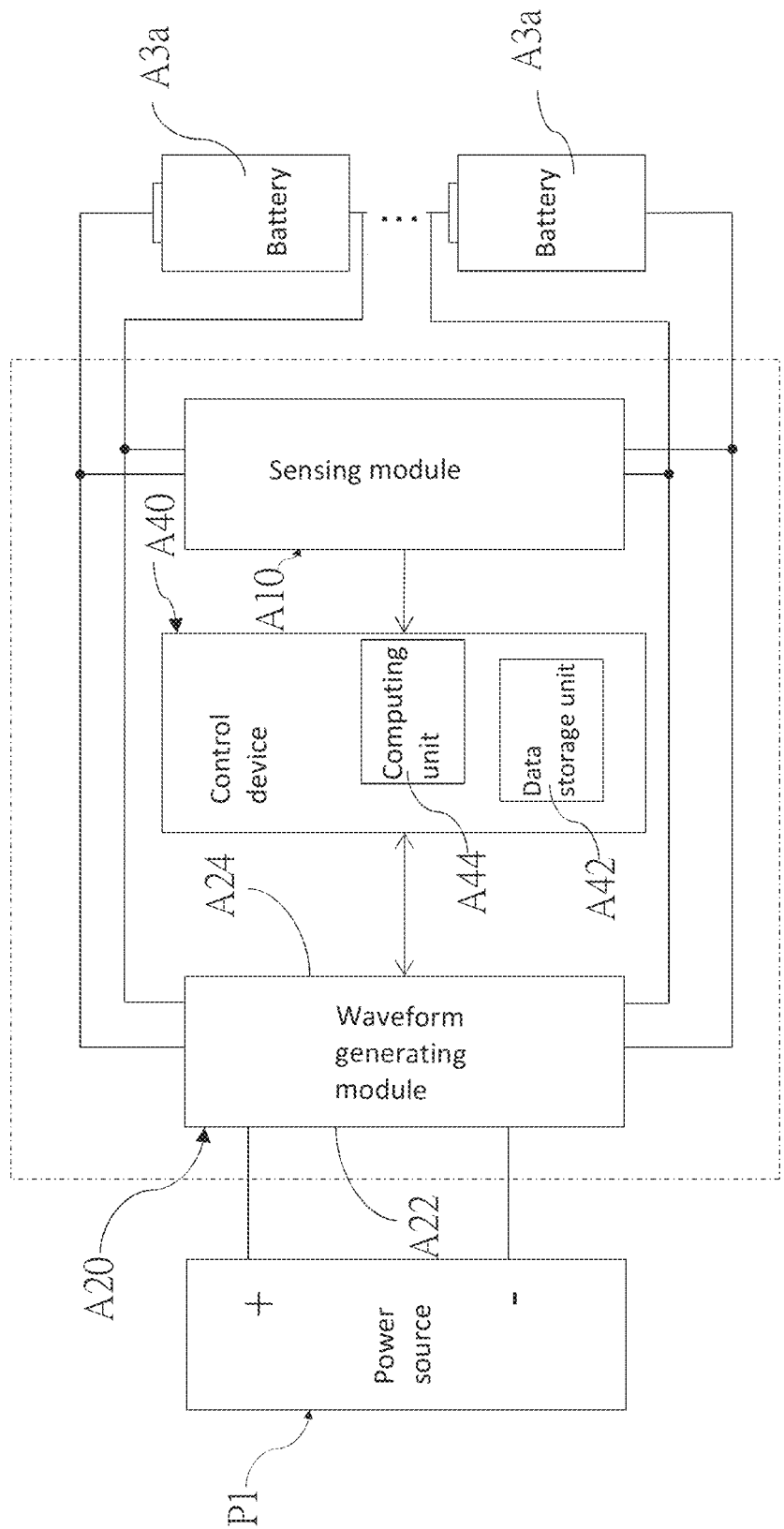
FIG. 7 is a block diagram of the battery charging system according to another embodiment of the present invention.

In addition to integrating the charging system and the power supplying system into the power management system, the present invention further provides a circuit design of only the charging system or only the power supplying system. More specifically, a charging system of another embodiment according to the present invention is illustrated in FIG. 7, wherein the control device A40 thereof is electrically connected to the sensing module A10 and the waveform generating module A20. According to the parameter values (i.e., the first parameter values) obtained by the sensing module A10, the control device A40 controls the waveform generating module A20 to convert the power sent from the power source P1 into a plurality of charging waveforms corresponding to the parameter values via a power source side A22 of the waveform generating module A20, wherein the charging waveforms form a charging electric energy having a composite waveform to be sent from a load side A24 of the waveform generating module A20, whereby charging the batteries A3a.

The difference between the charging system shown in FIG. 7 and the charging system of the power management system in FIG. 3 is that the control device of the charging system shown in FIG. 7 further includes a data storage unit A42 and a computing unit A44, wherein the data storage unit A42 is adapted to store the parameter values, which are obtained by sensing the batteries A3a via the sensing module A10, and charging data that the waveform generating module A20 charges the batteries A3a according to the parameter values. The computing unit A44 computes the parameter values and the corresponding charging data so as to obtain a relation between the parameter values and the charging data. When the sensing module A10 senses the battery state of the batteries A3a, taking the SOH and the DCIR as an example, the control device A40 obtains a voltage value corresponding to the SOH sensed by the sensing module A10 and a resistance value corresponding to the DCIR sensed by the sensing module A10, and stores the voltage value and the resistance value into the data storage unit A42. When the waveform generating module A20 outputs the charging electric energy with the composite waveform to the batteries A3a according to the voltage value and the resistance value, both of waveform data corresponding to the charging electric energy and charging data which is formed by data corresponding to the SOH and the DCIR sensed by the sensing module A10 after the batteries A3a are charged, are stored into the data storage unit A42. The computing unit A44 computes the data stored in the data storage unit A42, and a computing result of the computing unit A44 is fed back to the control device A40 to modify the charging waveform converted by the waveform generating module A20 which is controlled by the control device A40, thereby to optimize the charging system.

Figure 8:
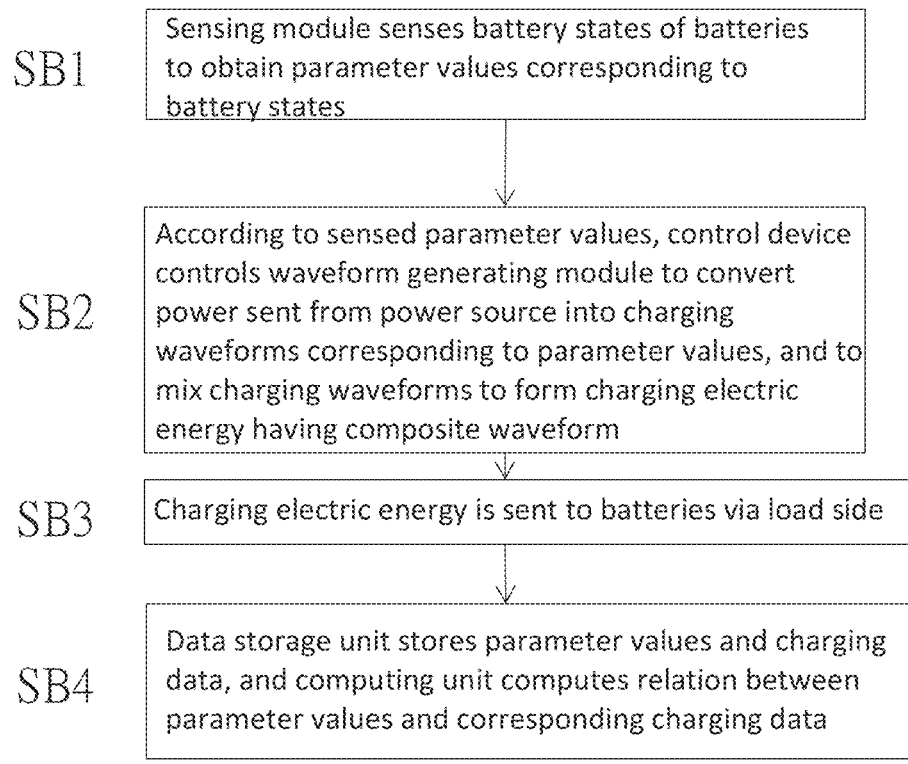
FIG. 8 is a flowchart of the operating method of the battery charging system according to the another embodiment of the present invention.

With the aforementioned design, the operating method according to the current embodiment could be executed, wherein the operating method includes the following steps shown in FIG. 8.

First, in step SB1, the parameter values (i.e., the first parameter values) corresponding to the battery states are obtained by sensing the battery states of the batteries A3a via the sensing module A10.

In step SB2, according to the sensed parameter values, the control device A40 controls the waveform generating module A20 to convert the power sent from the power source P1 into the charging waveforms corresponding to the parameter values via a power source side A22, wherein the charging waveforms mix to form a charging electric energy having a composite waveform. For instance, the charging waveforms could include a square wave having different properties (such as different amplitudes and/or frequencies), and each of the parameter values forms a corresponding square wave depending on the different parameter values of the batteries A3a, and the square waves constitute a charging electric energy having a composite waveform.

In step SB3, the charging electric energy is sent to the batteries A3a via the load side A24. In the current embodiment, the parameter values sensed by the sensing module A10 set at least one of the amplitude, the frequency, the offset voltage of the charging electric energy.

For example, when the sensing module A10 senses the DCIR of the batteries A3a, the resistance value corresponding to the DCIR is obtained. According to the resistance value, the control device A40 sets the amplitude of the charging electric energy sent from the waveform generating module A20, and obtains the type of batteries A3a and its amount of power, and controls the amplitude of the waveform generated by the waveform generating module A20 according to the type of batteries A3a and its amount of power. When the sensing module A10 senses the SOH of the batteries A3a, the voltage value corresponding to the SOH is obtained. According to the voltage value, the control device A40 sets the offset voltage of the charging electric energy sent from the waveform generating module A20, wherein the reason for setting the offset voltage is that the batteries A3a in different states of health have different voltage values, and the higher the voltage value, the higher the offset voltage. When the sensing module A10 senses the ACIR of the batteries A3a, the resistance value corresponding to the ACIR is obtained. According to the resistance value, the control device A40 sets the frequency of the charging electric energy sent from the waveform generating module A20, determining whether to use a high frequency depending on the resistance value. When the resistance value is greater than a predetermined value set in the control device A40, the frequency of the charging electric energy is a high frequency, thereby to lower the resistance value.

In addition, another difference between the charging system shown in FIG. 7 and the charging system of the power management system shown in FIG. 3 is that after step SB3, the charging system in FIG. 7 further includes step SB4. In step SB4, the data storage unit A42 of the control device A40 stores the parameter values of the batteries A3a obtained by the sensing module A10 and the charging data which is generated by sensing the batteries A3a via the sensing module A10 after the batteries A3a is being charged. The data stored in the data storage unit A42 form a database. The computing unit A44 computes a relation between the data stored in the database, and the computing result of the computing unit A44 is fed back to the control device A40 to modify the charging waveform sent by the waveform generating module A20, thereby optimizing the charging system. In this way, when the charging system charges the batteries A3a, the charging system could provide the batteries A3a with a better charging performance.

Figure 9:
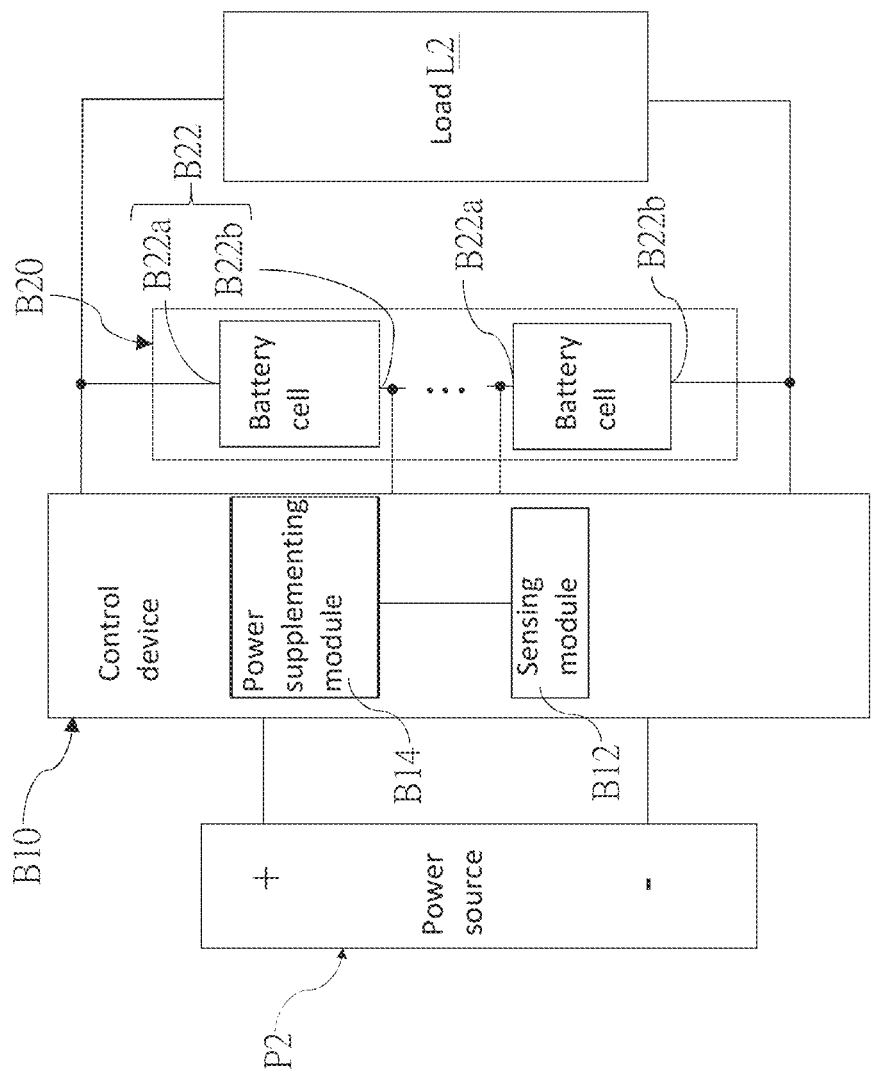
FIG. 9 is a block diagram of the power supplying system according to another embodiment of the present invention.

A power supplying system of another embodiment according to the present invention is illustrated in FIG. 9, which includes a control device B10 and a battery B20, and the battery B20 is electrically connected to a load L2. The battery B20 includes a plurality of battery cells B22, and each of the battery cells B22 has a positive electrode B22a and a negative electrode B22b.

Figure 10:
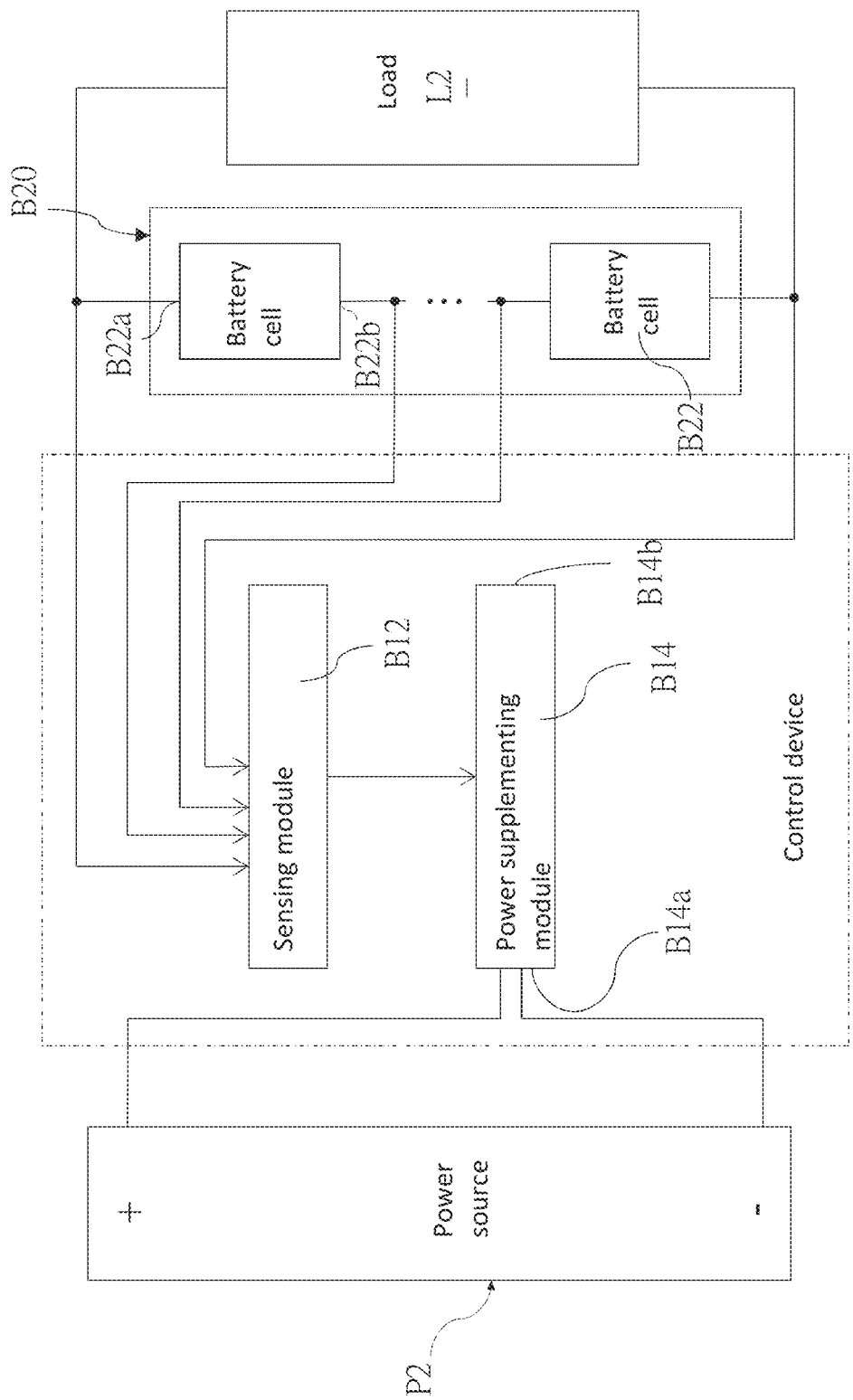
FIG. 10 is a schematic view, showing that the sensing module senses the parameter value of each of the battery cells.
Figure 11:
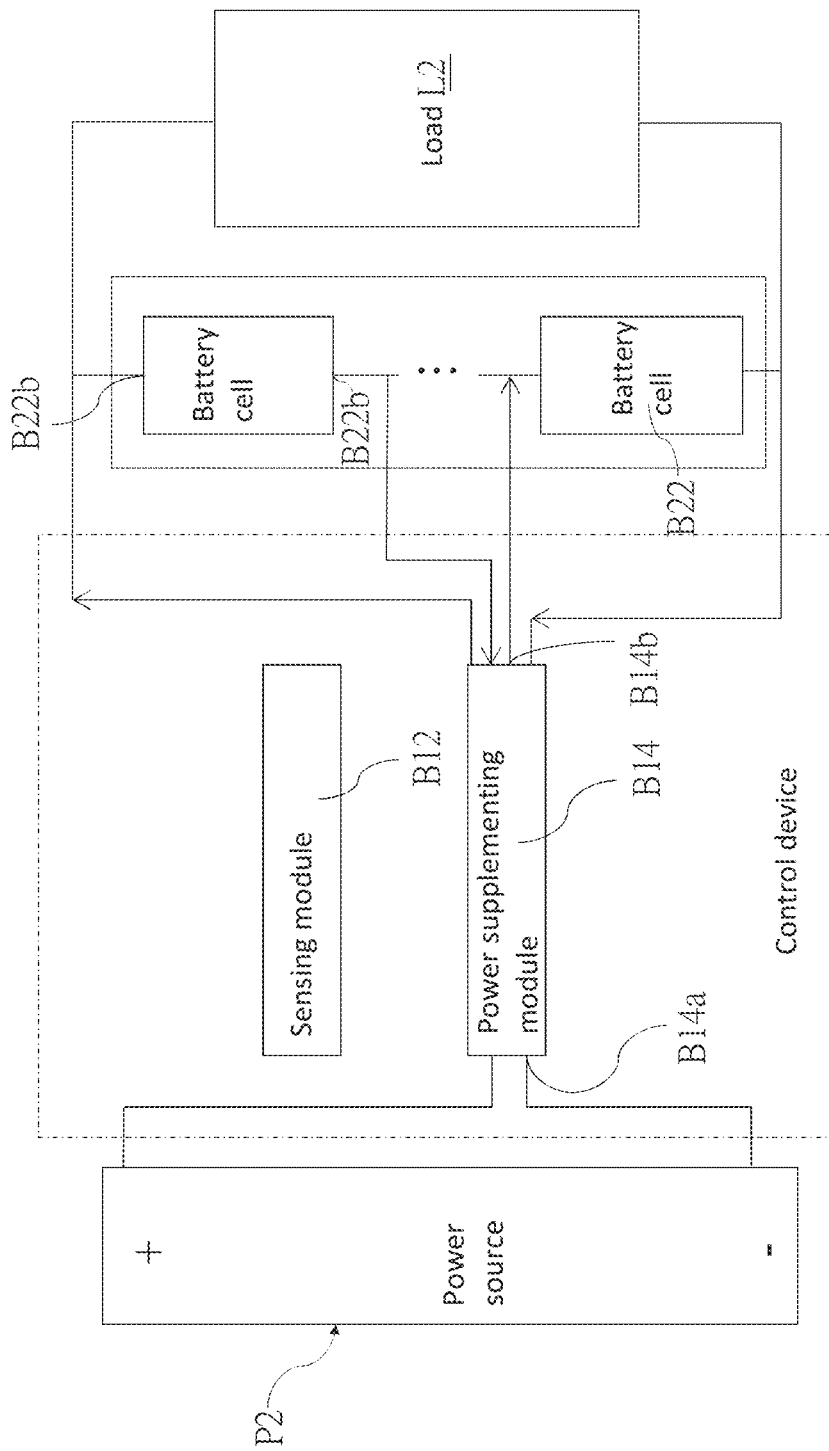
FIG. 11 is a schematic view showing that the power supplementing module provides the supplementing power to each of the battery cells.

The difference between the power supplying system shown in FIG. 9 and the power supplying system of the power management system in FIG. 3 is that the control device B10 is integrated with a sensing module B12 and a power supplementing module B14. As shown in FIG. 10 and FIG. 11, the sensing module B12 is electrically connected to the power supplementing module B14 and the positive electrode B22a and the negative electrode B22b of each of the battery cells B22. A power source side B14a of the power supplementing module B14 is electrically connected to a power source P2, and a load side B14b of the power supplementing module B14 is electrically connected to the positive electrode B22a and the negative electrode B22b of each of the battery cells B22.

In the current embodiment, the power supplementing module B14 determines whether to output a supplementing power to the positive electrode B22a and the negative electrode B22b of the corresponding battery cell B22 according to the parameter value (i.e., the second parameter value) obtained by the sensing module A10. In the current embodiment, the supplementing power is a current.

Figure 12:
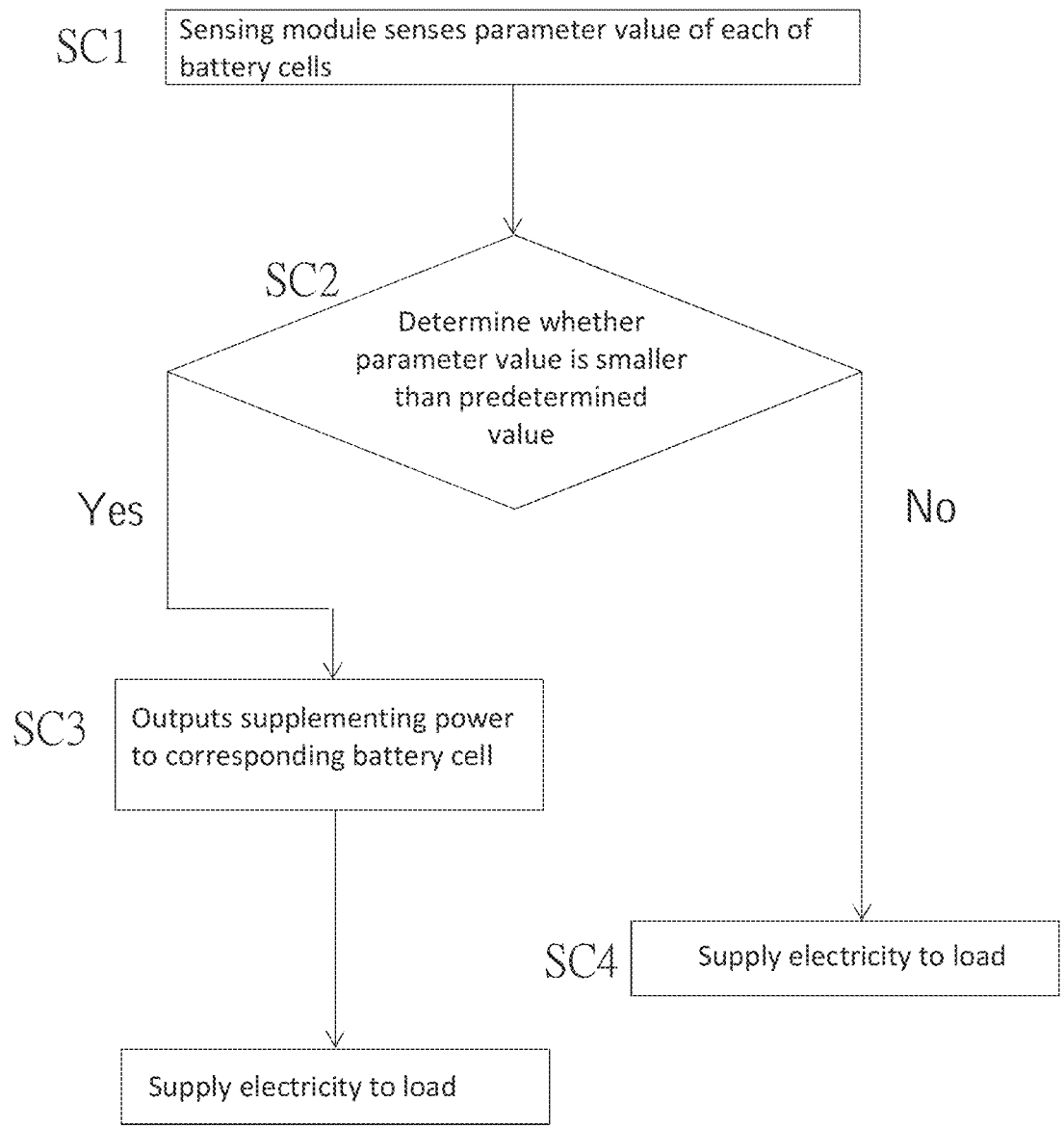
FIG. 12 is a flowchart of the operating method of the power supplying system according to the another embodiment of the present invention.

With the aforementioned design, the operating method according to the current embodiment shown in FIG. 12 could be executed.

First, in step SC1, the sensing module B12 senses the parameter value (i.e., the second parameter value) of each of the battery cells B22.

In step SC2, the parameter values obtained by the sensing module B12 are compared with a predetermined value stored in the control device B10 to determine whether the parameter value of any of the battery cells B22 is smaller than the predetermined value. In the current embodiment, the predetermined value is a current value, wherein the current value is the lowest current that the power supplying system allows the battery cells B22 to output. For instance, the predetermined value could be set to 80% of the rated current value of the battery cells B22. In other embodiments, corresponding to different types of parameter values (e.g. voltage difference or power), the predetermined value could be a voltage value or a power value.

If a parameter value of any of the battery cells B22 is smaller than the predetermined value, take step SC3. In step SC3, the power supplementing module B14 outputs a supplementing power to the positive electrode B22a and the negative electrode B22b of the battery cell B22 which has the parameter value smaller than the predetermined value. The supplementing power and the battery cells B22 supply electricity to the load L2 together, so that the supplementing power could not only supply electricity to the corresponding battery cell B22, but also provides extra energy for supplementing an insufficient energy of the battery B20 to the load L2. In other embodiments, the supplementing power could be voltage.

If no parameter value of any of the battery cells B22 is smaller than the predetermined value, take step SC4. In step SC4, only the battery B20 supply electricity to the load L2.

With the power supplying system and the operating method thereof, when the power supplying system supplies power to the load, the power supplementing module provides a supplementing power to the degraded or damaged battery. In this way, the battery with a degraded or damaged battery cell would not be replaced, whereby extending the useful life of the power supplying system.

Figure 13:
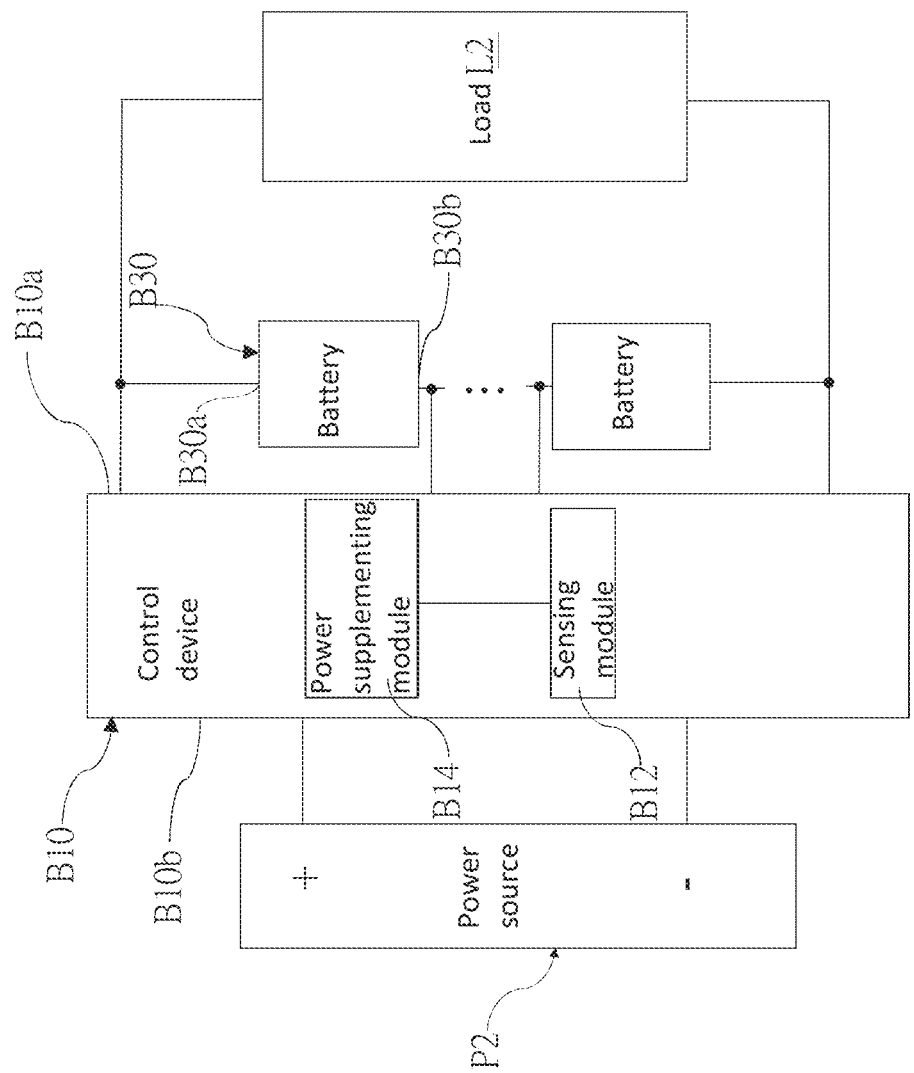
FIG. 13 is a block diagram of the power supplying system according to still another embodiment of the present invention.

A power supplying system of still another embodiment according to the present invention is illustrated in FIG. 13, wherein the difference between the power supplying system shown in FIG. 13 and the power supplying system shown in FIG. 9 is that the power supplying system shown in FIG. 13 includes a plurality of batteries B30. In the current embodiment, a load side B10a of the control device B10 is electrically connected to the load L2 and a positive electrode B30a and a negative electrode B30b of each of the batteries B30, and a power source side B10b of the control device B10 is electrically connected to the power source P2. The operating method of the power supplying system is the same as the aforementioned embodiment. That is, the control device B10 also includes the sensing module B12 and the power supplementing module B14, wherein the sensing module B12 is adapted to sense a parameter value between the positive electrode B30a and the negative electrode B30b of each of the batteries B30. The power supplementing module B14 is adapted to determine whether the parameter value is smaller than a predetermined value, and outputs a supplementing power when the parameter value is smaller than a predetermined value. In this way, the power supplementing module B14 could provide extra energy for supplementing an insufficient energy to the corresponding battery B30 when the performance of at least one battery B30 is decreased, so that the overall power supply of the power supplying system would not lower due to the degradation of the performance of at least one battery B30.

In conclusion, the power management system of the present invention and the operating method thereof could sense the battery state of each of the batteries, whereby respectively providing a better charging electric energy to each of the batteries. The charging electric energy could not only provide a better charging performance, but also avoid the aging of the batteries by providing a suitable charging electric energy to each of the batteries, extending the service life of the batteries and enhancing the charging efficiency and providing a better environmental protection effect. In addition, when the battery pack supplies power to the load, the power supplementing module could solve the problem of the inconsistent power of the batteries sent to the load.

The battery charging system of the present invention and the operating method thereof could restore the aging battery or the battery with degraded performance to a better state by controlling the charging electric energy generated by the waveform generating module via the control device when the batteries are charging. For instance, when the batteries are aged, the resistance value of the ACIR will increase, and the charging electric energy with high frequency could effectively reduce the resistance value of the ACIR, whereby restoring the batteries to a better state. In addition, the waveform generating module could generate a charging electric energy constituted by plurality of charging waveforms and could charge the respective batteries. In this way, the charging system of the present invention could simultaneously charge various different batteries, and respectively provide an optimal charging performance according to the parameter values of each of the batteries so that the various batteries could be maintained better, extending the service life of the batteries and providing a better environmental protection effect.

The power supplying system of the present invention and the operating method thereof could be maintained at a certain power supplying performance by sensing the batteries via the sensing module, and providing a supplementing power to the batteries via the power supplementing module. More specifically, when the performance of at least one battery in the battery pack is degraded or when at least one battery in the battery pack is damaged, the power supplying system of the present invention could provide a supplementing power to the batteries via the power supplying system, so that the power supplying system could stably supply power to the load. Whereby, the overall power supply of the power supplying system would not be affected due to the degradation of the performance of the batteries or the damage of the batteries, providing a better environmental protection effect, which is economical.

It must be pointed out that the embodiments described above are only some preferred embodiments of the present invention. All equivalent structures and methods which employ the concepts disclosed in this specification and the appended claims should fall within the scope of the present invention.

What is claimed is:

1. An operating method of a battery charging system, wherein said battery charging system is adapted to charge at least one battery, and said battery charging system comprises a waveform generating module, a sensing module, and a control device; wherein said waveform generating module has a power source side and a load side, wherein said power source side is electrically connected to a power source, and said load side is electrically connected to at least one battery; said sensing module is electrically connected to at least one battery; said control device is electrically connected to said waveform generating module and said sensing module; and said operating method comprising steps of:
   A. sensing a plurality of battery states of said at least one battery by said sensing module to obtain a parameter value corresponding to each of the battery states;
   B. controlling said waveform generating module by said control device according to the parameter values sensed by said sensing module, so that said waveform generating module converts the power sent from said power source into a plurality of charging waveforms corresponding to the parameter values and mixes the charging waveforms to form a charging electric energy having a composite waveform; and
   C. sending the charging electric energy to said at least one battery via said load side.

2. The operating method of claim 1, wherein the charging waveforms include at least one of a square wave, a pulse wave, a sine wave, and a triangular wave.

3. The operating method of claim 1, wherein the battery states include a direct-current internal resistance (DCIR); in step A, said sensing module senses the DCIR of said at least one battery to obtain the parameter value corresponding to the DCIR; in step B, setting an amplitude of the charging electric energy according to the parameter value.

4. The operating method of claim 1, wherein the battery states include a state of health (SOH); in step A, said sensing module senses the SOH of said at least one battery to obtain the parameter value corresponding to the SOH; in step B, setting an offset voltage according to the parameter value.

5. The operating method of claim 1, wherein the battery states include an alternating current internal resistance (ACIR); in step A, said sensing module senses the ACIR of said at least one battery to obtain the parameter value corresponding to the ACIR; in step B, setting a frequency of the charging electric energy according to the parameter value.

6. The operating method of claim 1, wherein said control device further comprises a data storage unit and a computing unit, and, after step C further comprising steps of: storing the parameter values and a plurality of charging data into said data storage unit, and computing a relation between each of the parameter values and the corresponding charging data by said computing unit.

7. The operating method of claim 1, wherein after step C further comprising a step of: repeating step A1, step A2, and step A3 by sensing a charging power of said at least one battery or according to a charging time interval of said at least one battery.

\* \* \* \* \*